W. R. UHLEMANN.
EYEGLASS BRIDGE.
APPLICATION FILED SEPT. 5, 1913.

1,167,953.

Patented Jan. 11, 1916.

Witnesses:
John Enders,
Henry Moe.

Inventor:
William R. Uhlemann,
by Robert Burns
Atty.

UNITED STATES PATENT OFFICE.

WILLIAM R. UHLEMANN, OF CHICAGO, ILLINOIS.

EYEGLASS-BRIDGE.

1,167,953.  Specification of Letters Patent.  Patented Jan. 11, 1916.

Application filed September 5, 1913. Serial No. 788,340.

*To all whom it may concern:*

Be it known that I, WILLIAM R. UHLEMANN, a citizen of the United States of America, and a resident of Chicago, in the county of Cook, State of Illinois, have invented certain new and useful Improvements in Eyeglass-Bridges, of which the following is a specification.

This invention relates to the connecting bridges of eyeglass and spectacle lenses, and has for its object to provide a simple and efficient bridge formation of structure adapted to afford very efficient sanitary properties to eyeglasses and spectacles, and in addition to provide the property of invisibility, so that the use of the eyeglasses or spectacles will not be so apparent as the ordinary structure heretofore employed, all as will hereinafter more fully appear.

Figure 1:
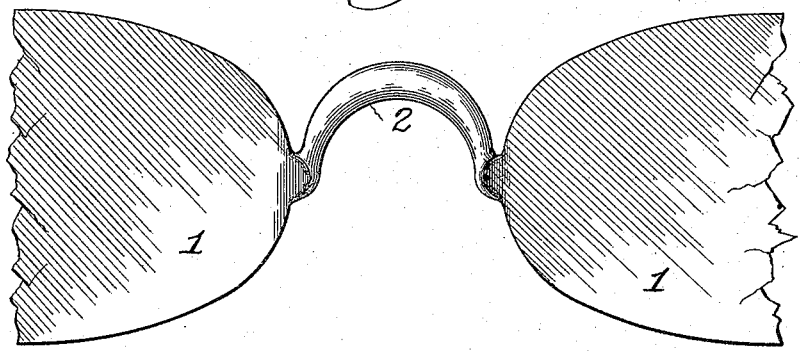
Figure 2:
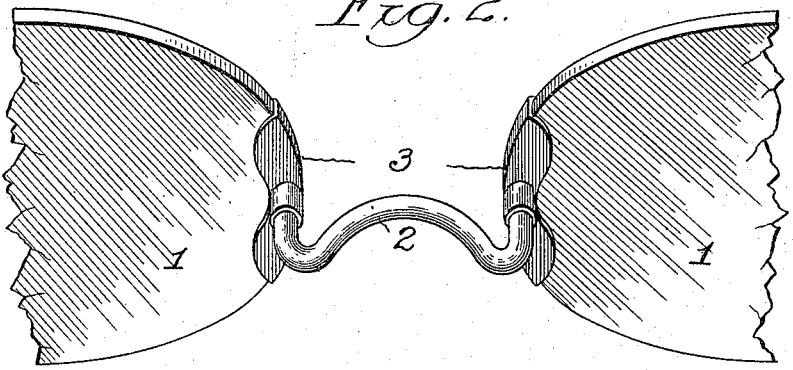
Figure 3:
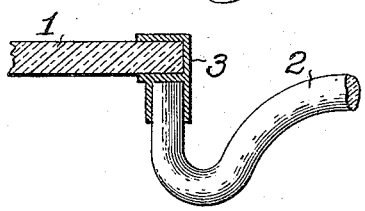
Figure 4:
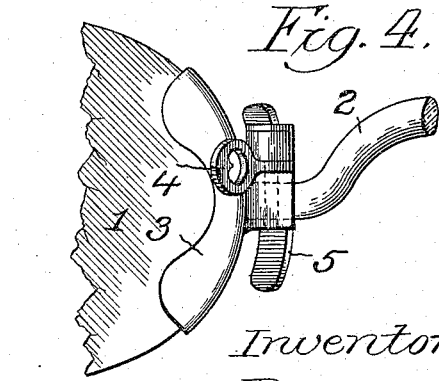

In the accompanying drawings: Figure 1 is a fragmentary elevation illustrating the application of the present invention to a pair of eyeglass lenses, with the bridge or arch of glass or like vitreous material integrally connected to the adjacent portions of said lenses. Fig. 2 is a detail perspective view illustrating a modified arrangement of parts in which the bridge is attached to the lenses by intermediate clips. Fig. 3 is a horizontal section of the same. Fig. 4 is a detail front elevation illustrating the application of the present invention to the finger piece type of eyeglass mountings.

Similar reference numerals indicate like parts in the several views.

Referring to the drawings, 1 represents adjacent portions of a pair of lenses of a pair of eyeglasses or spectacles, and 2 the bridge or arch by which they are connected together. In the present invention said bridge or arch is formed wholly of glass or like vitreous material possessing the features of approximate transparency combined with a smooth sanitary surface.

In the preferred form of the present invention, illustrated in Fig. 1, the respective ends of the bridge or arch 2, are fused, welded or otherwise formed as an integral part of the pair of lenses 1. It is however, within the scope of the present invention to secure the ends of the bridge or arch 2, to the lenses 1 in any other well known and suitable manner, and as illustrative of such modified means I have shown in Figs. 2, 3 and 4, intermediate clips 3 onto which the ends of the bridge 2 are cemented or otherwise secured, while said clips 3 are in turn secured to the adjacent edges of the lenses 1 by cement or other well known fastening means.

The last mentioned construction is very desirable in some forms of eyeglass mountings, in that the clips 3, afford a support or bearing for the attachment of the spring impelled finger piece or levers 4, which carry the nose guards 5 of the well known type of finger-piece eyeglass mountings now in general use.

The material ordinarily used for bridges heretofore has been of a yielding nature so that the lenses joined thereby may unknowingly become displaced and therefore cause injury to the eyes of the wearer owing to the change of focus. They are clearly noticeable by their opaqueness. They are acted on by sweat. They are liable to corrode by such moisture and cause irritation of and injury to the skin upon which they necessarily rest when they become heated. They are also expensive. I have discovered by experiment that all of these objectionable features, possessed by the ordinary bridges, are avoided by the use of glass or other vitreous material which possesses absolute rigidity for accurately holding the lenses in place as regards optical centers, invisibility, inconspicuousness, is non-irritable and sanitary as there is not any oxidation, comfortable to the wearer, owing to coolness of the material, and inexpensive in production.

Having thus fully described my said invention, what I claim as new and desire to secure by Letters Patent, is:

1. An eyeglass bridge or arch formed of vitreous material.

2. An eyeglass bridge or arch formed of transparent vitreous material.

3. An eyeglass bridge or arch formed of vitreous material and integrally connected to the eyeglass lenses.

4. An eyeglass bridge or arch formed of transparent vitreous material and integrally connected to the eyeglass lenses.

Signed at Chicago, Illinois, this 3rd day of September, 1913.

WILLIAM R. UHLEMANN.

Witnesses:
 ROBERT BURNS,
 HYDE W. PERCE.

Copies of this patent may be obtained for five cents each, by addressing the "Commissioner of Patents, Washington, D. C."